US006385769B1

(12) United States Patent
Lewallen

(10) Patent No.: US 6,385,769 B1
(45) Date of Patent: *May 7, 2002

(54) TEXT BASED OBJECT ORIENTED PROGRAM CODE WITH A VISUAL PROGRAM BUILDER AND PARSER SUPPORT FOR PREDETERMINED AND NOT PREDETERMINED FORMATS

(75) Inventor: Stephen Lewallen, Cupertino, CA (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/243,251

(22) Filed: Feb. 3, 1999

(51) Int. Cl.[7] .................................. G06F 9/44

(52) U.S. Cl. .................. 717/125; 717/143; 717/116

(58) Field of Search ................ 717/1, 6, 125, 717/143, 116

(56) References Cited

U.S. PATENT DOCUMENTS

| 5,446,902 A | * | 8/1995 | Islam | .......................... 395/703 |
| 5,546,519 A | | 8/1996 | Berry | |
| 5,642,511 A | | 6/1997 | Chow et al. | |
| 6,286,138 B1 | * | 9/2001 | Purcell | .......................... 717/11 |

OTHER PUBLICATIONS

"The Theory of Parsing, Translation and Compiling vol. 1:Parsing", A.V. Aho et al. Table Of Contents, 1972.*
"Object–Oriented Compiler Construction", Jim Holmes, Nov. 24, 1994, pp. 1–15, 19–24, 75–124, 185–246.*
"Understanding ActiveX and OLE A Guide for Developers & Managers", David Chappell, Microsoft Press, Chapters 1–3,5,7,9,10 and Index, Sep. 24, 1996.*

The Java and HotJava Object Models, by Michael Weiss, Andy Johnson, and Joe Kiniry, Version 2.1, Feb. 9, 1996, pp. 1–10.

Overview of Java and Hotjava, by Michael Weiss, Andy Johnson, and Joe Kiniry, Version 2.1, Feb. 9, 1996, pp. 1–6.

A First Look into VisualAge for Java, by Bob Brodd and Mark Lorenz, pp. 1–8.

Providing Easier Access to Remote Objects in Distributed Systems, by Jonathan Aldrich, James Dooley Scott Mandelsohn and Adam Rifkin, Nov. 21, 1997, pp. 1–35.

* cited by examiner

*Primary Examiner*—Gregory Morse
*Assistant Examiner*—Todd Ingberg
(74) *Attorney, Agent, or Firm*—Kudirka & Jobse, LLP

(57) ABSTRACT

Text-based object-oriented class code, located in either local or remote machines is converted into proxy components which can be used in existing visual builders. Proxy components are created from each method, including constructors, in the class code and encapsulate the parameters of the methods. For example, parameters associated with a method are represented by properties of the proxy component created from that method. These properties are visually editable and can be bound visually to other component properties using, for example, pull down menus in a visual builder. Exceptions which occur during operation of the method are treated as events and can be visually passed to other components. An add-on allows the components to appear directly in the visual builder palette. The components can interact with the text-based class code by means of a universal transport API.

30 Claims, 10 Drawing Sheets

TEXT BASED OBJECT ORIENTED PROGRAM CODE WITH A VISUAL PROGRAM BUILDER AND PARSER SUPPORT FOR PREDETERMINED AND NOT PREDETERMINED FORMATS

FIELD OF THE INVENTION

The present invention relates, in general, to software programming systems and methods, and more specifically, to visual programming techniques for use with object-oriented software languages.

BACKGROUND OF THE INVENTION

Software is increasingly becoming a major portion of cost associated with computer systems because it is very "labor-intensive." Some of this cost is due to the effort involved in writing and debugging programs, other costs involve maintaining programs after they have been written. Accordingly, considerable effort has been expended in order to reduce the time and costs involved with writing, debugging and maintaining moderate and large software programs. Much of this effort has been related to developing programming languages and programming techniques which will allow programmers to build on or "reuse" programs and code segments that have been written by others.

Until very recently, software programming was heavily dominated by an approach referred to as "structured programming." Common software programming languages used in this approach were, and remain, BASIC, FORTRAN, and PASCAL. These are considered "higher order" languages that are written in human readable code and ultimately translated into machine or computer readable code by a compiler. Typically, structured programs have consisted of a combination of defined variables of specific data types, e.g. integer, real, and character, and a complimentary set of functions or routines which operate on these variables. Often, a program would include sub-routines which are smaller routines within a program or larger routine that carry out certain operations, e.g. printing data in a given output format. The emphasis to this approach was inputs—functions—outputs and they were often represented as flowcharts by the designers, which logically represented how the program functioned and branched into different functional paths. As an increasing number of programs became large (tens of thousands of lines of code and above) structured programs became increasingly complex and difficult to write, troubleshoot and maintain.

Flowcharts became unwieldy and the tracking of errors through permutations of variables, lengthy code, and a wide variety of program branches was time and cost intensive and often produced less than adequate results. Consequently, a new approach to software programming called Object-Oriented Design (OOD) or Object-Oriented Programming (OOP) emerged and has gained increasing popularity among software developers. OOP promised greater reuse and maintainability than its structured programming predecessor because of an emphasis on well-defined and self contained objects, rather than the structured programming emphasis on a proliferation of relatively loosely-related data manipulating functions and subroutines.

Object Oriented Programming techniques involve the definition, creation, use and destruction of "objects." These objects are software entities comprising data elements, or attributes, and methods, or functions, which manipulate the data elements. The attributes and related methods are treated by the software as an entity and can be created, used and destroyed as if they were a single item. Together, the attributes and methods enable objects to model virtually any real-world entity in terms of the entity's characteristics, represented by the data elements, and the entity's behavior, represented by data manipulation functions or methods. In this way, objects can model concrete things like people and computers, and they can also model abstract concepts like numbers or geometrical designs.

Objects are defined by creating "classes" which are not objects themselves, but which act as templates that instruct the computer how to construct the actual object. A class may, for example, specify the number and type of data variables and the steps involved in the methods which manipulate the object's data. When an object-oriented program is compiled, the class code is compiled into the program, but no objects exist. Therefore, none of the variables or data structures in the compiled program exist or have any memory allotted to them. An object is actually created by the program at runtime by means of a special function called a "constructor" which uses the corresponding class definition and additional information, such as arguments provided during object creation, to construct the object. Likewise, objects can be destroyed by a special function called a "destructor" or can be destroyed by special programs called "garbage collectors" when no longer needed. Objects may be used by using their data and invoking their methods. When an object is created at runtime, memory is allotted and data structures are created.

The principle benefits of object-oriented programming techniques arise out of three basic principles; encapsulation, polymorphism and inheritance. Specifically, objects can be designed to hide, or encapsulate, all, or a portion of, the internal data structure and the internal methods. More particularly, during program design, a program developer can define objects in which all or some of the attributes and all or some of the related methods are considered "private" or for use only by the object itself. Other data or methods can be declared "public" or available for use by other programs. Access to the private variables by other programs can be controlled by defining public methods for an object which access the object's private data. The public methods form a controlled and consistent interface between the private data and the "outside" world. Any attempt to write program code which directly accesses the private variables causes the compiler to generate an error during program compilation which error stops the compilation process and prevents the program from being run.

Polymorphism is a concept which allows objects and functions which have the same overall format, but which work with different data, to function differently in order to produce consistent results. For example, an addition function may be defined as variable A plus variable B (A+B) and this same format can be used whether the A and B are numbers, characters or dollars and cents. However, the actual program code which performs the addition may differ widely depending on the type of variables that comprise A and B. Polymorphism allows three separate function definitions to be written, one for each type of variable (numbers, characters and dollars). After the functions have been defined, a program can later refer to the addition function by its common format (A+B) and, at runtime, the program will determine which of the three functions is actually called by examining the variable types. Polymorphism allows similar functions which produce analogous results to be "grouped" in the program source code to produce a more logical and clear program flow.

The third principle which underlies object-oriented programming is inheritance, which allows program developers to easily reuse pre-existing programs and to avoid creating software from scratch. The principle of inheritance allows a software developer to declare classes, and the objects which are. later created from them, as related. Specifically, classes may be designated as subclasses of other base classes. A subclass "inherits" and has access to all of the public functions of its base classes just as if these functions appeared in the subclass. Alternatively, a subclass can override some or all of its inherited methods or may modify some or all of its inherited methods merely by defining a new method with the same form. Overriding or modification does not alter the method in the base class, but merely modifies the use of the method in the subclass. The creation of a new subclass which has some of the functionality, with selective modification, of another class allows software developers to easily customize existing code to meet their particular needs.

Object-Oriented Programming languages include C++ and Java, as well as other languages. Each language has an express or implied "object model." Generally speaking, an object model is a unifying set of rules that describe object structure, object life cycle, and inter-object communication. Object structure relates to the physical layout of objects in memory, while object life cycle refers to how applications create and destroy objects. Inter-object communication refers to protocols by which objects communicate with one another. Object models are useful in contexts where all objects in a given system need to conform to a given protocol governing these parameters. Most object-oriented and object-based languages, including the Java programming language, do not specify true object models, but merely specify syntax and semantics of a basic object implementation without specifying the actual rules that unify object systems. Some object-oriented languages also incorporate the notion of "components" which are self-contained objects that perform a specified function or procedure. Components have a pre-defined interface that conforms to the object model of the underlying language and generally conform to a "component model" associated with the language.

Initially, the promise of reusability and economy of OOP was not realized. Standards were not in place to insure interoperability of objects or cross-platform interoperability. This problem became even more evident when the Internet and the World Wide Web (Web) emerged as widely-used resources and ensured that a wide variety of platform configurations would attempt to access and use commonly-available information on the Internet. As a result, applications designed to operate on the Web used languages designed specifically for the Web, such as hyper-text mark-up language (HTML) as a way to provide a static, but commonly useable, form of coded information while object-oriented programming was applied in other applications. But the problem of cross-platform interoperability persisted and grew as it became more desirous to add dynamic capability to the Web and as many organizations were using multiple platforms and grappling with interoperability internally. Also, the proliferation of objects conforming to different object models prevented significant reuse, as originally envisioned.

Recently, along with the increased distribution of code among dissimilar systems for use, there has also been an increased desire for programmers to share code over a distributed system. A distributed system is one in which there are typically multiple computer systems accessing or sharing information among one another. Client-server systems, for example, are distributed computer systems. These various systems use a variety of persistent stores, e.g. ODBC, JDBC, and flat-file, and directory services, e.g. LDAP and URL. This variation in systems causes incompatibilities and inefficiencies in sharing code. Often times, programmers will have to modify code received from others in order to make it re-useable. This additional work tends to decrease code reuse and, even if reuse is attempted, stretch out the code development for new applications.

In order to solve these problems, a number of common object architectures were developed. These include the Common Object Request Broker Architecture (CORBA) and the Remote Method Invocation (RMI) system. The CORBA architecture includes an Interface Definition Language (IDL) which allows objects written in different languages to have standardized interfaces so that the objects will be able to communicate. CORBA and RMI also includes mechanisms for transporting communications between remotely-located objects which have interfaces that conform to their specifications. CORBA and RMI have allowed interoperability among objects written in various OOP languages and for use on various platforms.

In addition in order to using more efficient languages to reduce programming time, programming techniques have also been improved. Initially, program were written by typing lines of program statements. In the case of OOP programs, time was spent entering information with complicated syntax which was relatively standard from object to object. For example, for each constructor or method, a programmer normally wrote lines of code to marshal the data for each parameter of the method or constructor. The programmer then had to write a code line to call the method. In the case of methods, the programmer had to write code lines to capture and store the result of the method call. Finally, the programmer had to write code to deal with exceptions that occurred during the method call. This was tedious and led to a proliferation of typographical and spelling errors which increased the debugging time.

However, recently, "visual builders" are increasingly being used to expedite programming. A visual builder allows programs to be written with the help of a Graphical User Interface (GUI). Objects can be represented by icons which encapsulate the "standard" portions of the code and allow program developers to create program code for objects by specifying the object properties and writing code for the object methods. The visual builder then generates the actual class code for the object, including the code for marshaling data and handling results and exceptions. Many visual builders contain predefined components which can be customized or used to derive other components. These pre-defined components are generally represented as icons on a "palette", to which new components can be added. A programmer using the visual builder manipulates these components on the screen, or "in the active window" or "workspace", to create new components.

In some visual builders, the objects or components can also be linked by the programmer using the visual builder interface to create a unique program. As a result, it is not necessary, to some degree, for a visual programmer to spend as much time entering code and debugging minor mistakes as a typical software developer who must enter the code text directly.

Examples of visual builders are disclosed in U.S. Pat. No. 5,546,519 to Berry, which illustrates describes a system and method for the visual programming of iterator link objects using a standard visual builder, whereby the user need not know the programming language itself. Properties of objects are also editable, usually via pull-down menus, and new objects can be added to the visual builder palette, primarily as a function of the visual builder itself.

In U.S. Pat. No. 5,642,511 to Chow et. al., a system and method are described for implementing an improved visual builder which allows a program developer to manipulate a hierarchical tree used to represent an OOP program. In the Chow patent a "proxy" tree comprised of proxy objects is built by using a visual builder to copy and edit user selected objects, thereby creating a new program.

Visual builders are attractive because they help to reduce programming time. However, each object or component used in the visual builder must be built by customizing an existing visual builder class or by creating a new component "from scratch." It would be desirable to be able to use existing objects and components, represented by textual program code, with such builders. To date, there is no automated way to create components which can be directly used in the builders from unparsed object-oriented class code statements. Therefore, in order to use objects created from such classes, a program developer must recreate the class or component with the builder by appropriately defining the properties and coding the methods.

Additionally, when components are created using a visual builder, it is desirable to test them within the visual builder application without creating objects from the components and incorporating them into applications. However, current visual builders do not allow the components to be tested in this efficient manner. Instead, they require an object to actually be constructed from the component before the object can be tested. If the object works, it is assumed that the component coding is correct. Once a component is tested and shown to operate correctly, then it can be safely incorporated in to a visual builder palette for use by other developers.

Consequently, a need exists for a method and apparatus for creating object oriented component, from existing object oriented text-based code. A need also exists for creating these components in accordance with defined object standards, e.g. CORBA and IDL. Furthermore, a need exists to create these components in such a manner that the newly-created components can be used with existing visual builders.

SUMMARY OF THE INVENTION

An inventive method and system convert text-based object-oriented class code, located in either local or remote machines into proxy components which can be used in existing visual builders. Proxy components are created from each method, including constructors, in the class code and encapsulate the parameters of the methods. For example, parameters associated with a method are represented by properties of the proxy component created from that method. These properties are visually editable and can be bound visually to other component properties using, for example, pull down menus in a visual builder. Exceptions which occur during operation of the method are treated as events and can be visually passed to other components.

In accordance with one embodiment, a universal transport application programming interface (API) provides a mechanism for manipulating objects in a "component-oriented" manner on either local or remote platforms. Essentially, the universal transport API is an object request broker which is controlled by the proxy components and includes two transport implementations: one for local transport and one for remote transport. The local transport implementation allows access to local OOP code resident on a user's computer. The remote transport implementation allows a user to access and use OOP classes resident on other computers, even if the classes do not conform to either the Remote Method Invocation (RMI) or the Common Object Request Broker Architecture (CORBA) specifications without manually wrapping the classes. Invocations of methods and constructors, and exceptions generated by the during the method invocations are each encapsulated into separate classes in a way which permits late binding and allows the invocation information to be serialized.

In accordance with another embodiment, a component-oriented compiler can parse any text-based OOP source code and create components for each of its public constructors and methods. The compiler retrieves all relevant entities, such as constructors, methods, fields, comments and parameter names. The parameters, fields, and properties of a constructor become the bound properties of the resultant constructor component. The parameters of a method become the bound properties of a method component. Finally, the method component includes a special bound property called "result" which contains the result of a method event. The compiler compiles the code it generates, creates a manifest file, and includes all files in an archive file.

In accordance with yet another embodiment, a visual environment add-on (VEA) program operates with a standard visual builder to permit complex applications to be built without the need to include any extra programming steps to preserve exceptions or properties. The VEA program allows an OOP component, including those generated by the aforementioned compiler, to be placed on the existing palette of the visual builder so that the component can be manipulated by the visual builder to generate a component-based application.

BRIEF DESCRIPTION OF THE DRAWINGS

The above and further advantages of the invention may be better understood by referring to the following description in conjunction with the accompanying figures, described below.

DETAILED DESCRIPTION OF THE PREFERRED EMBODIMENT

Figure 1:
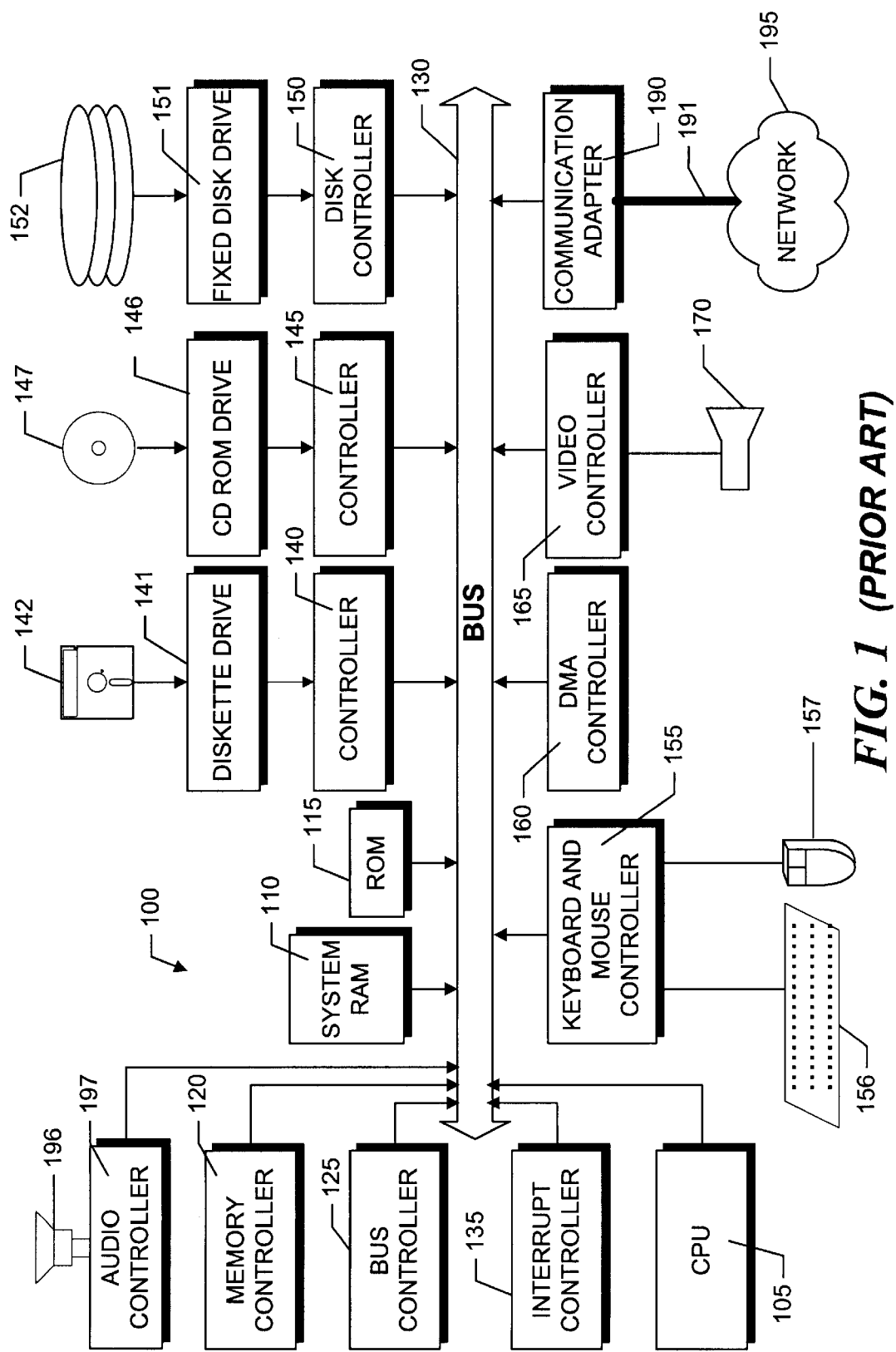
FIG. 1 is a block diagram of a computer system suitable for use with the present invention.

FIG. 1 illustrates the system architecture for a computer system 100 such as an IBM PS/2®, on which the invention may be implemented. The exemplary computer system of FIG. 1 is for descriptive purposes only. Although the description may refer to terms commonly used in describing particular computer systems, such as in IBM PS2 computer, the description and concepts equally apply to other systems, including systems having-architectures dissimilar to FIG. 1.

Computer system 100 includes a central processing unit (CPU) 105, which may be implemented with a conventional microprocessor, a random access memory (RAM) 110 for temporary storage of information, and a read only memory (ROM) 115 for permanent storage of information. A memory controller 120 is provided for controlling RMA 110.

A bus 130 interconnects the components of computer system 100. A bus controller 125 is provided for controlling bus 130. An interrupt controller 135 is used for receiving and processing various interrupt signals from the system components.

Mass storage may be provided by diskette 142, CD ROM 147, or hard drive 152. Data and software may be exchanged with computer system 100 via removable media such as diskette 142 and CD ROM 147. Diskette 142 is insertable into diskette drive 141 which is, in turn, connected to bus 30 by a controller 140. Similarly, CD ROM 147 is insertable into CD ROM drive 146 which is, in turn, connected to bus 130 by controller 145. Hard disk 152 is part of a fixed disk drive 151 which is connected to bus 130 by controller 150.

User input to computer system 100 may be provided by a number of devices. For example, a keyboard 156 and mouse 157 are connected to bus 130 by controller 155. An audio transducer 196, which may act as both a microphone and a speaker, is connected to bus 130 by audio controller 197, as illustrated. It will be obvious to those reasonably skilled in the art that other input devices, such as a pen and/or tabloid may be connected to bus 130 and an appropriate controller and software, as required. DMA controller 160 is provided for performing direct memory access to RAM 110. A visual display is generated by video controller 165 which controls video display 170. Computer system 100 also includes a communications adaptor 190 which allows the system to be interconnected to a local area network (LAN) or a wide area network (WAN), schematically illustrated by bus 191 and network 195.

Operation of computer system 100 is generally controlled and coordinated by operating system software, such as the OS/2® operating system, available from International Business Machines Corporation, Austin, Tex. The operating system controls allocation of system resources and performs tasks such as processing scheduling, memory management, networking, and I/O services, among other things.

The Java programming language is rapidly emerging as the preferred OOP language for Internet and cross platform use because Java programs consist of bytecodes, which are architecture and operating system independent and can be sent over the Internet and other networks. The bytecode is actually executed on a particular platform by means of a "virtual machine" (VM) which allows a Java program to be run on any platform, regardless of whether the Java program was developed on, or for, the particular platform which attempts to run the Java program. Java bytecodes which arrive at the executing machine are interpreted and executed by the embedded VM.

A complete Java program is known as an application, while a segment of Java code, which does not amount to a full application, but is reusable, is referred to as an "applet". Java also includes a component model. A component within Java is referred to as a "bean," and includes a defined interface. Java beans are used within applets and applications and a programmer need not know the internal structure of the Java bean to use it, he need only know the interface. In addition, once the interface of a bean is known, a programmer can create a new customized component from the base Java bean component. The Java bean contains properties and methods, which can be changed when another bean is derived created from the bean, which is how customization of the new component is achieved.

Because Java programs are intended to be transmitted over the Internet, the final program is packaged into what is referred to as a Java Archive (JAR) file. The JAR file is actually a "zipped", or compressed, file which includes all related files for that application, applet, or component. Also included in the JAR file is a manifest file, which includes extra information concerning the zipped portion of the file. For example, the manifest file can indicate the contents of the JAR file and whether a particular zipped file is a bean or a resource file, its file version number, and so on.

Since Java is well-suited to operation over networks, the following description of the illustrative embodiment is directed toward the Java programming language. However, it will be obvious to those skilled in the art that the invention could be implemented for other OOP languages as well, e.g. C++.

Figure 2:
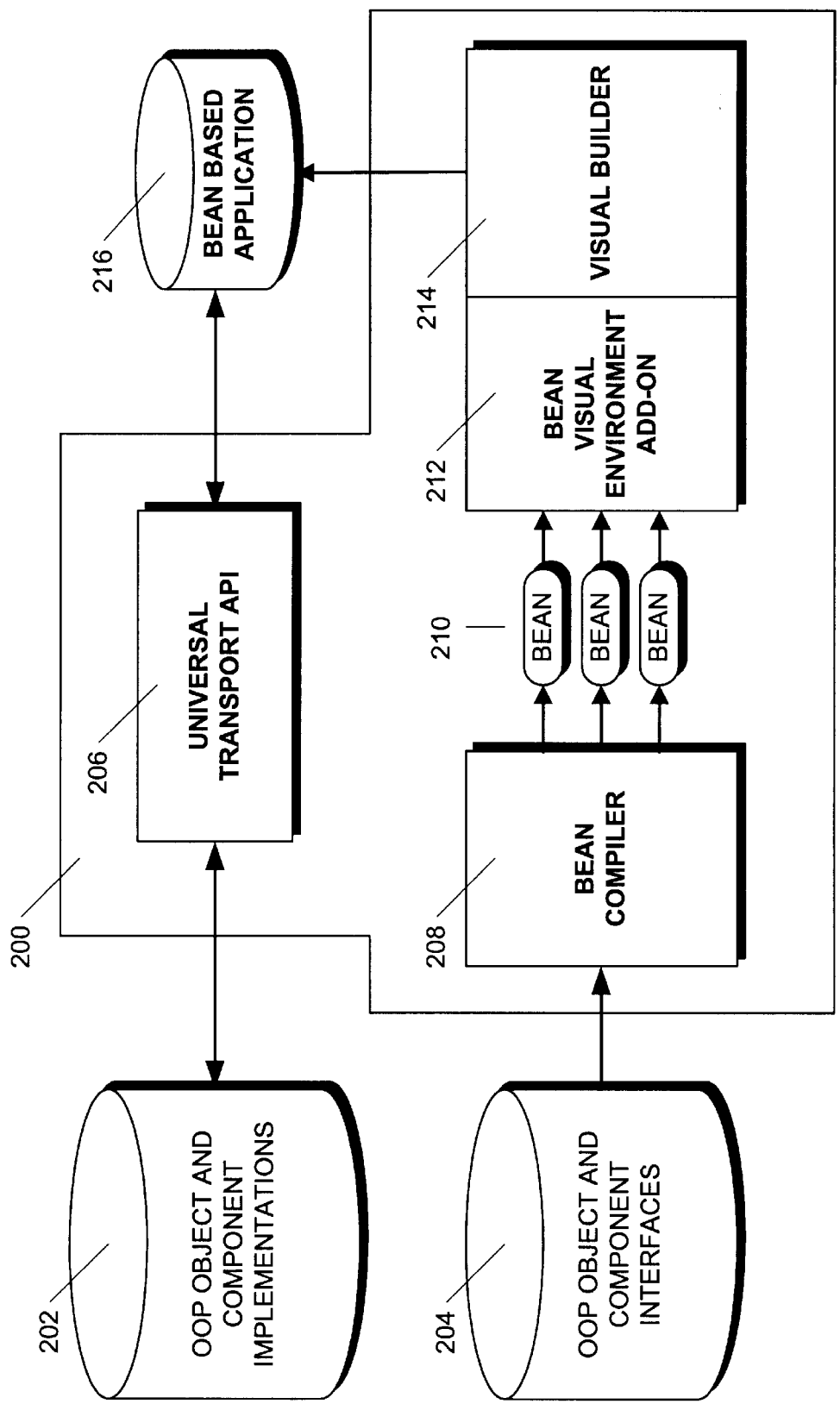
FIG. 2 is a schematic block diagram of a bean creator constructed in accordance with the principles of the present invention.

FIG. 2 shows an illustrative embodiment of a component creator apparatus 200 constructed in accordance with the principles of the present invention which is used with computer 100, or its equivalent. In accordance with Java terminology, the component creator 200 will hereinafter be referred to as "bean creator" 200. The inventive apparatus enables a computer user or programmer to build "bean-based" applications 216 from existing text-based OOP code 202, 204 using a standard visual builder 214. The primary components of the illustrative embodiment 200 are universal transport API 206, bean compiler 208, and bean visual environment add-on 212. The bean creator 200 may be used for building applications on distributed systems or independently on a single computer.

OOP object and component interfaces 204 which define the objects and components which are to be used with the system are provided to a bean compiler 208. As previously mentioned, the bean compiler 208 converts each component into proxy components 210, where each method in the component is converted into a separate proxy component of the components 210. The proxy components 210 can be manipulated with the help of a conventional visual builder 214 which has been provided with a bean visual environment add-on that allows the proxy components to be recognized by the visual builder.

Using the visual builder an application 216 can be created with the proxy components. This application is essentially a collection of customized components. Each customized component is an interconnected collection of proxy components.

Each customized component in the application 216 can be tested within the visual builder by means of the universal transport API 206 which allows the code which implements the underlying objects and components 202 to be exercised under control of the proxy components. If the customized component does not operate properly, it can be rebuilt within leaving the visual builder environment. The different portions of the illustrative embodiment are discussed in more detail below.

Figure 3:
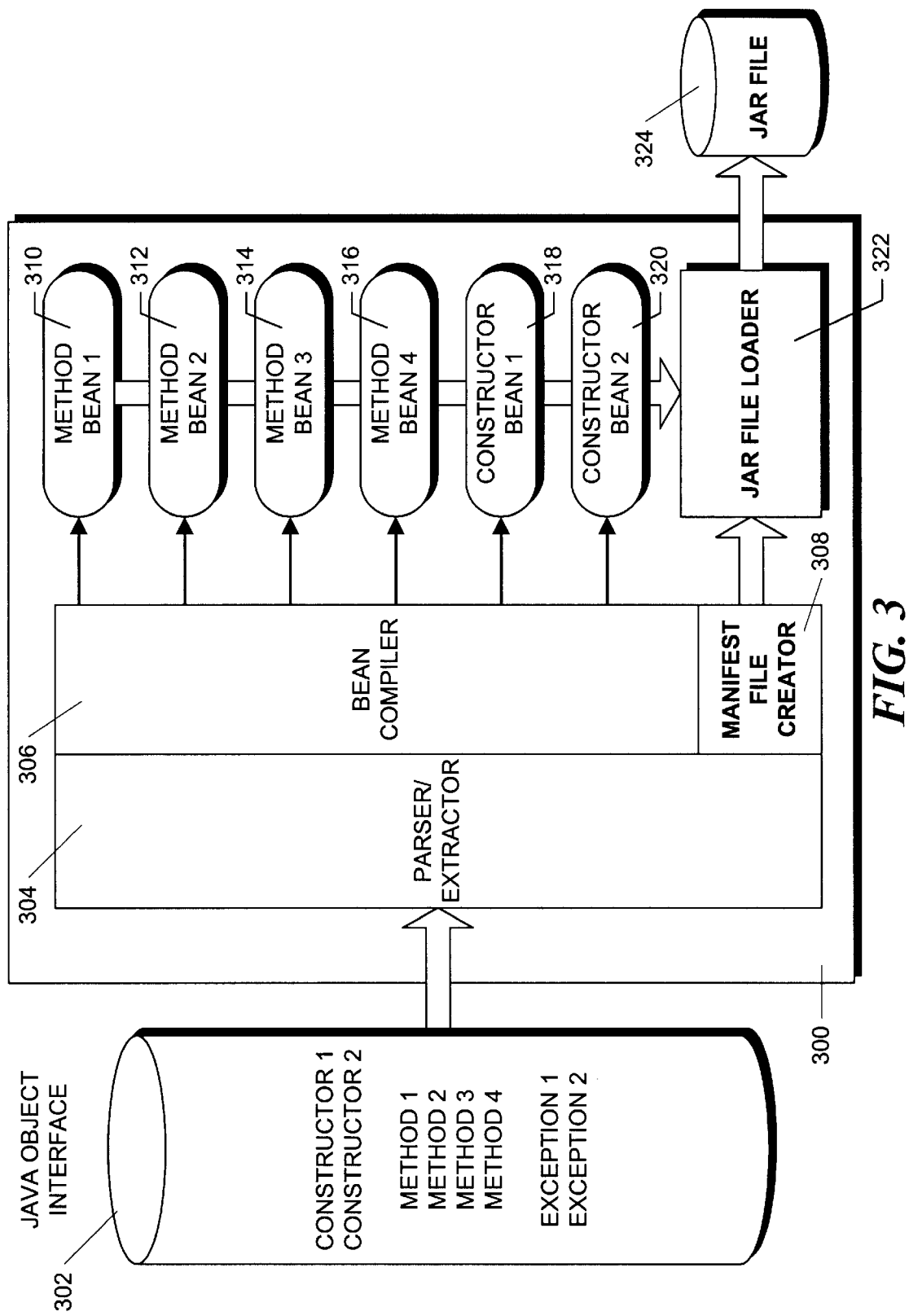
FIG. 3 is a more detailed block diagram of a bean compiler.

Referring to FIG. 3, the bean compiler 208 of the illustrative embodiment is shown in more detail. Bean compiler 300 accepts text-based Java class code from any source file 302, including Java class files and Java bean files. Bean compiler 302 parses the code and extracts the relevant methods and parameters. Illustratively, the OOP class code is the interface code for a Java class which includes two constructors (Constructor 1 and constructor 2), four methods (Method 1, Method 2, Method 3 and. Method 4). Identifiers from two exceptions (Exception 1 and Exception 2) are also included. These latter identifiers can be text messages or other identification code. Code 302 may also be source code for a component such as a Java bean.

Bean compiler 300 includes a parser/extractor 304 which, in turn, includes methods that parse and extract code from each Java class. Such a parser/extractor is conventional and may, for example, be similar to a parser used in a compiler which responds to source code by parsing and extracting keywords and other identifiers. From each class, the parser/extractor 304 parses each constructor and each method and extracts any related fields, comments, and parameter names. Using the extracted constructor information, the compiler module 306 creates and compiles a constructor bean such as beans 318 and 320. The compiler 306 also creates a method bean from extracted information for each method in the class, for example method beans 310–316.

As the beans are created they are inserted into a JAR file 324 by JAR File loader 322. Once all of the beans have been created, another module, the manifest file creator 308, of bean compiler 306 produces a complete manifest file, with an ".mf" suffix. Manifest files are customary in the Java programming language and well known, so will not be discussed in detail herein.

The compiler module extracts more detailed information than previously extracted by various conventional processing. For example, assume the following method existed in the interface class 302:

public Address getAddress
      String firstName,
      String lastName);

Unlike the conventional extraction process of "reflection", which would only determine that the method takes as parameters two string objects, the bean compiler 300 extracts the actual parameter names "firstName" and "lastName". Extracting these parameter names allows these parameters to be converted to properties of the method bean created from the original method "getAddress". Maintaining these parameters as properties allows more flexibility in the construction and customizing of new beans created from the getAddress method bean.

As previously mentioned, component creator 200 functions to convert text based Java class code and other Java beans into beans which can be combined to form a "bean-based" application by a conventional visual builder. In particular, Java class or Java bean interface code 204 is provided to bean compiler 208. Code 204 is either local or, in the case of a distributed object system, is generally exported by the remote server. As previously mentioned, bean compiler 208 generates a constructor bean for each constructor in the code and a method bean for each method. These beans 210 are provided to a visual builder 214. In accordance with the principles of the invention, visual builder 214 includes a bean visual environment add-on 212, which allows the beans 210 to appear directly on the builder's object palette. The beans can therefore be manipulated in a conventional fashion using builder 214 to generate a bean-based application 216.

The bean-based application 216 operates in conjunction with the universal transport API 206 to access the Java objects instantiated from a selected class called the "target" class in the class and bean implementations 202. In particular, universal transport API 206 operates under control of constructor and method objects instantiated by the beans 210 within bean-based application 216 to call the appropriate constructors and methods for the target class in the implementation code 202 as will be hereinafter explained in detail. The bean compiler 208, the bean visual environment add-on 212 and the universal transport API 206, function together to allow Java objects and components to be manipulated by means of a standard visual builder 214 regardless of whether the objects were originally designed to be used as beans. Bean components, which are normally not compatible with visual builder 214, can be incorporated therein by means of the inventive bean creator 200.

Figure 4:
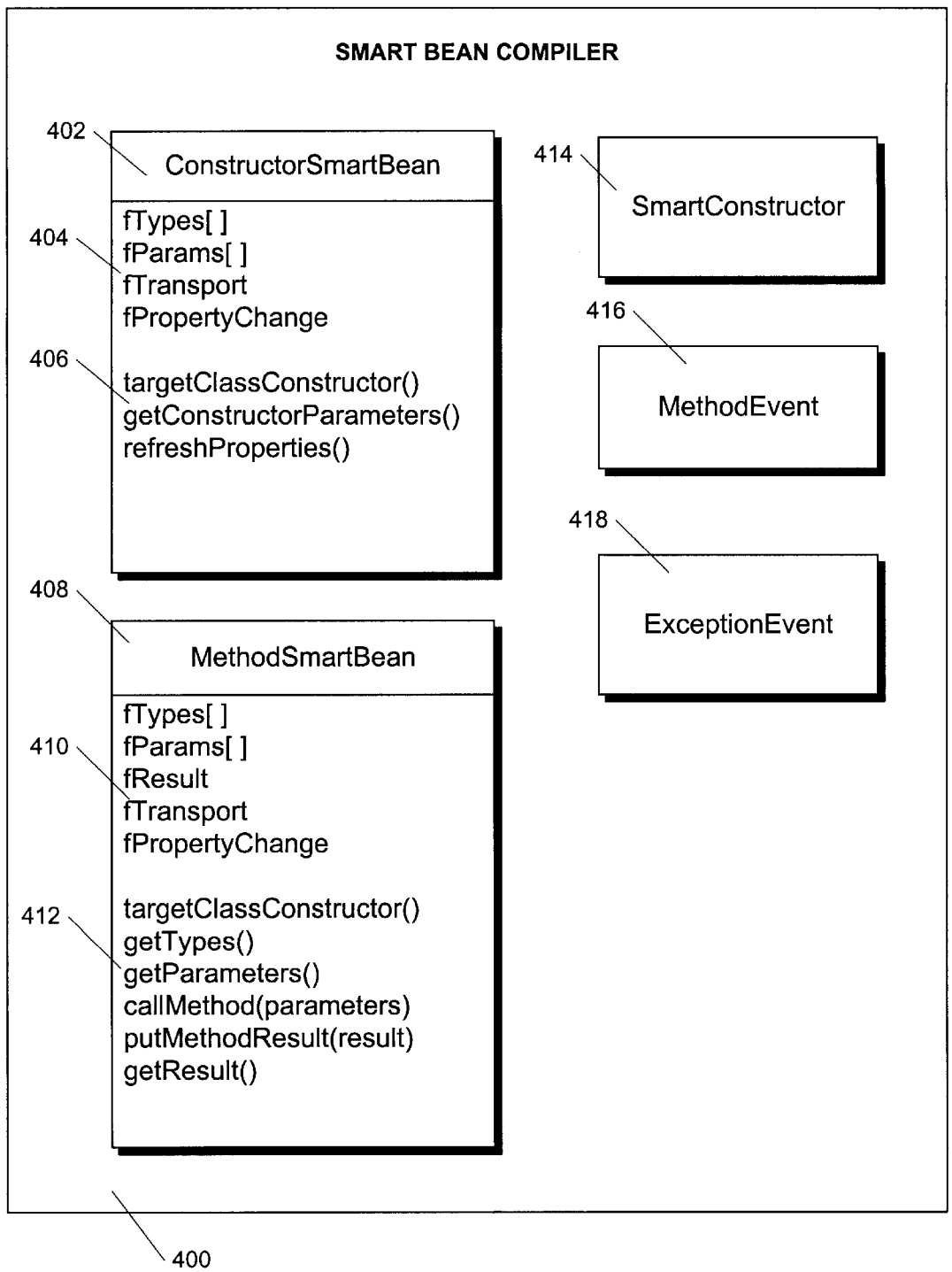
FIG. 4 is a schematic block diagram of classes used by the bean compiler of FIG. 3.

The bean compiler 208 generates code for the constructor beans and method beans by subclassing and modifying two main classes, which are illustrated in FIG. 4. These classes include the ConstructorSmartBean class 402 and the MethodSmartBean class 406, each of which has a set of properties and methods. For example, the ConstructorSmartBean class 402 has properties 404, which include the properties fTypes and fParams, which, as will hereinafter be described in more detail, are used to specify the type of constructor which will be used to instantiate an object from the target class. The ConstructorSmartBean properties also include the fTransport reference and the fPropertyChange reference, which are used to reference a transport object which will be used to forward the constructor and method calls to the target class and to reference a notification object that is part of a conventional notification system.

The ConstructorSmartBean class 402 also includes the plurality of methods including the targetClassConstructor( ) method, which is used to invoke the constructor of the target class, the getConstructorParameter( ) method, which is used to obtain parameters required by the targetClassConstructor( ) method and the refreshProperties( ) method, which is used to broadcast data change notifications.

Similarly, the MethodSmartBean class 408 includes properties 410, including the properties fTypes, fParams, fTransport, and fPropertyChange which are analogous to the similarly-named properties in the ConstructorSmartBean class 402. In addition, the MethodSmartBean class 408 includes an additional property, fResult, which is used to hold a result returned by the associated method call.

The result property can be manipulated by the putMethodResult( ), and getResult( ) methods, which are used to invoke force the result to a specified value and read the result. The MethodSmartBean class 408 also includes the targetClassConstructor( ), getTypes( ) and getParameters( ) methods, which are used in invoking a constructor in the target class and an additional method, callMethod( ), which is used to invoke the associated method.

Three additional classes, the SmartConstructor class 414, the MethodEvent class 416, and the ExceptionEvent class 418 are instantiated by the constructor and method beans to encapsulate various parameters and data which are associated with the constructor and methods of the target class and exceptions generated by the constructor and methods. Objects instantiated from these latter classes. are then forwarded, via the transport mechanism discussed previously, to the target class. In particular, the SmartConstructor class 414 encapsulates the parameters used in the constructor which instantiates the target class. Similarly, parameters associated with a method are encapsulated in the MethodEvent class 416 for transmission to the target object. Finally, exceptions generated by the target object are encapsulated in the ExceptionEvent class 418 for transmission back to the constructor or method bean, which initiated the constructor or method call.

Figure 5:
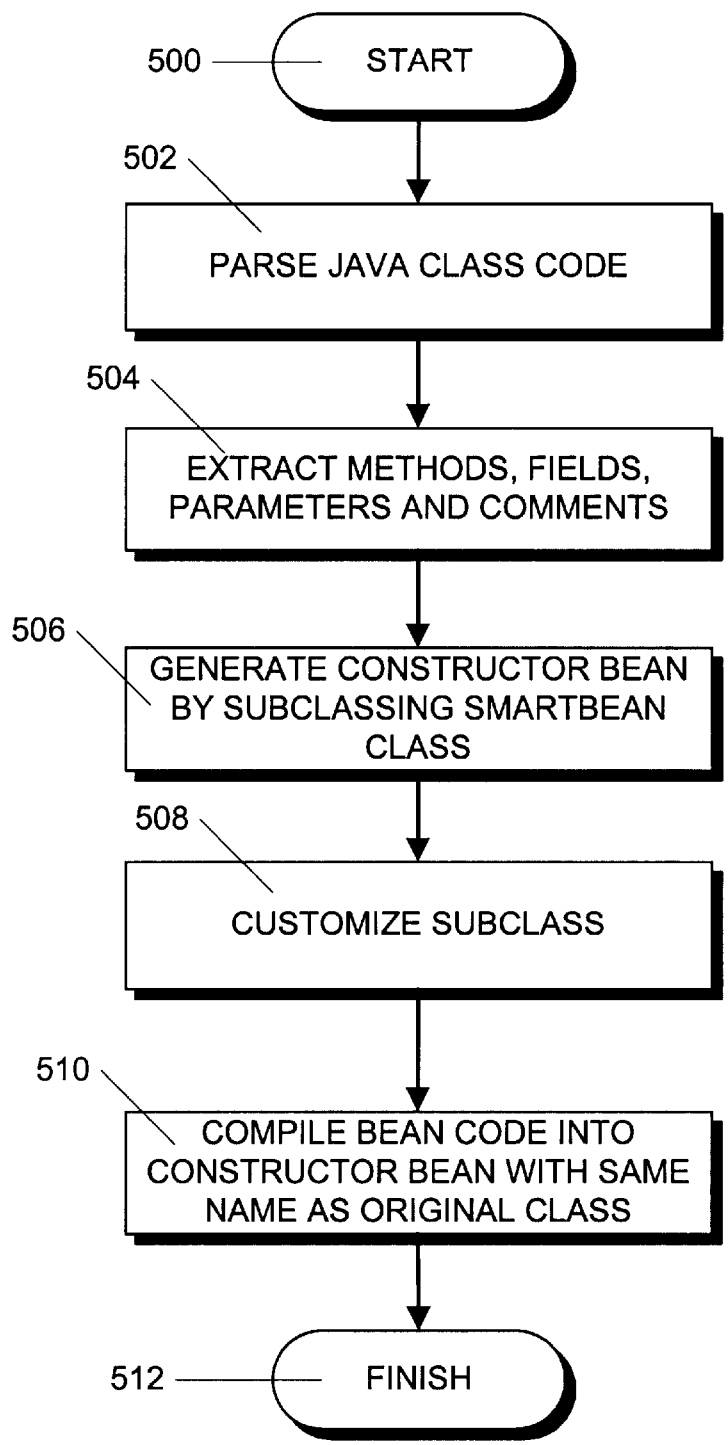
FIG. 5 is a flowchart depicting the steps in an illustrative routine for generating a constructor bean.

A routine for generating and compiling code for a constructor bean is illustrated in FIG. 5. The routine starts in step 500 and proceeds to step 502 where the Java class code is parsed. In step 504, the parsed code is examined to extract methods, fields, parameters, and comments.

Next, in step 506, the code for the constructor bean is generated by subclassing the ConstructorSmartBean class 402, and, in step 508, customizing the resulting subclass. During this process the parameters of the original constructor become the bound properties of the constructor bean with the suffix "_CP" added. In this context a "bound" property is a property which generates a data change notification when its value is changed.

In step 510, the bean code is compiled into the constructor bean which is given a name derived from the original Java class. The routine then finishes in step 512.

Figure 6:
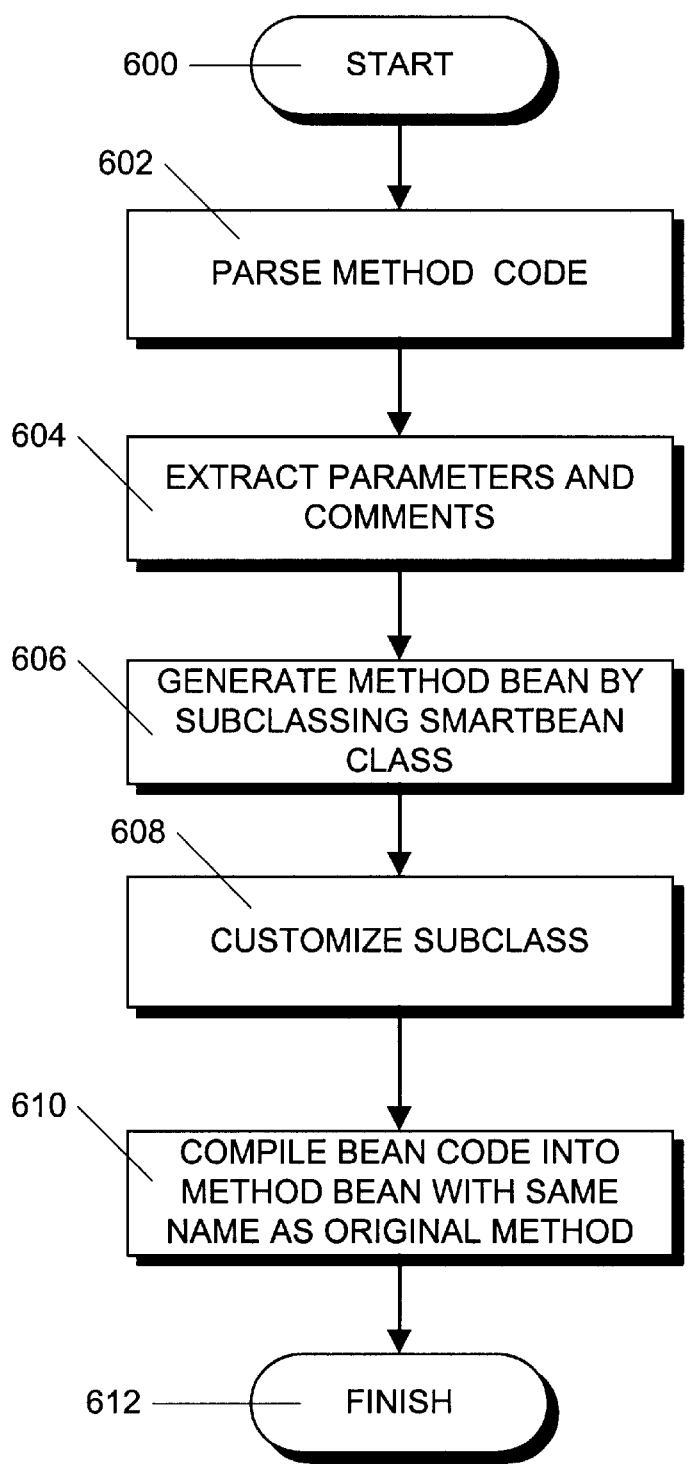
FIG. 6 is a flowchart depicting the steps in an illustrative routine for generating a method bean.

A similar routine is used to create and compile code for the method beans. Such a routine is shown in FIG. 6, which starts in step 600 and proceeds to step 602, in which the method code is parsed. In step 604, the parameters and comments associated with the method are extracted.

Next, in step 606, the method bean code is generated by subclassing the MethodSmartBean class 408 and customizing the subclass as indicated in step 608. During this process the parameters of the original method become the bound properties of the method bean. In addition, the special bound property called "result" is created to receive the result, if any, of the method call. Next, in step 610, the bean code is compiled into the method bean with a name derived from the original method name. The routine then finishes in step 612.

Figure 7:
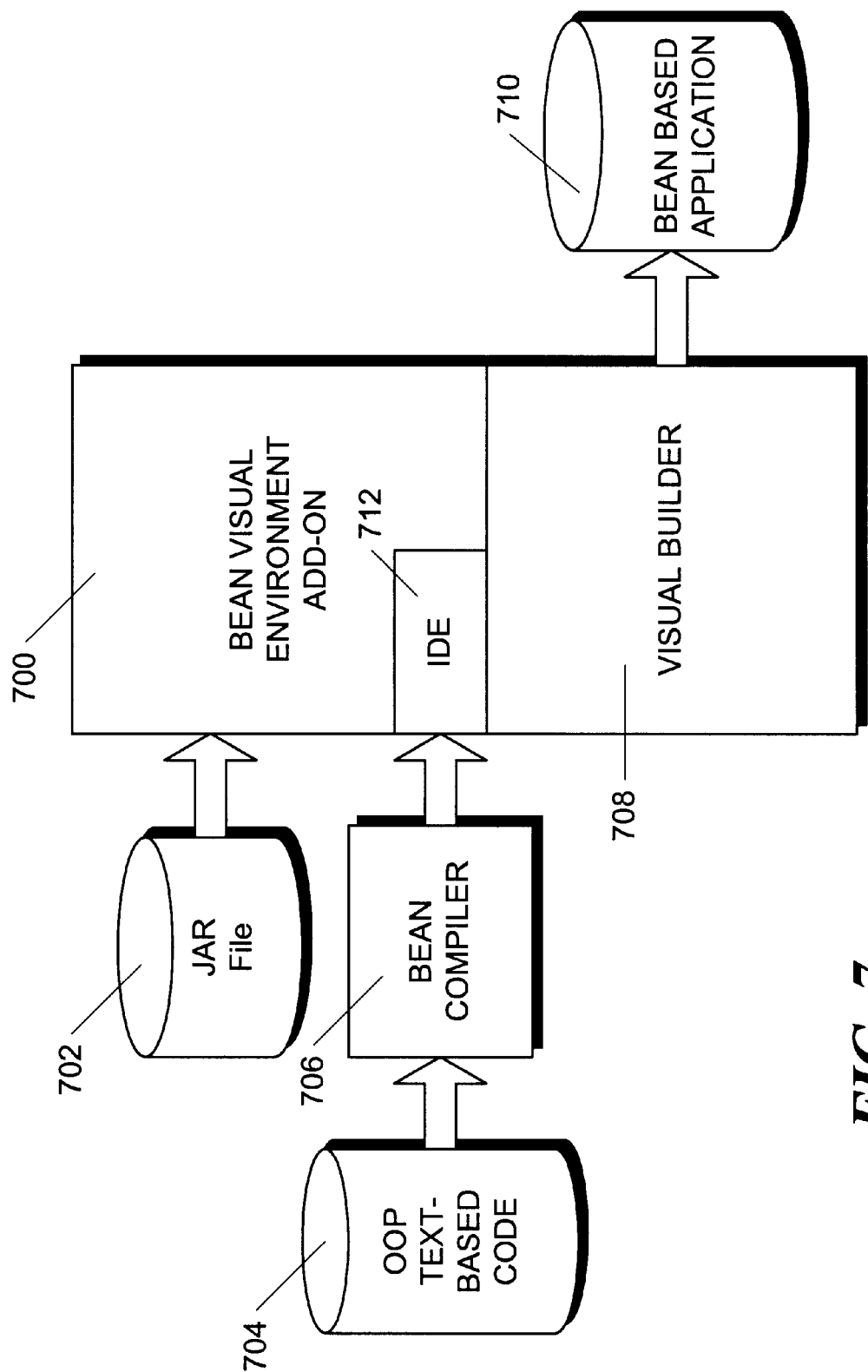
FIG. 7 is a more detailed schematic block diagram of a bean visual environment add-on illustrating the relationship with a visual builder.

The beans produced by the bean compiler can be used with a conventional visual builder by means of an add-on application. Referring to FIG. 7 of the illustrative embodiment, a visual environment add-on (VEA) program 700 extends the capability of a standard Java "bean-compliant" visual builder 708 to give the user of the visual builder 708 access to methods and constructors, as beans, within any OOP code. The Java bean-compliant visual builder 708 can be any conventional visual builder, such as the Visual Age WebRunner™ marketed by International Business Machines Corporation, Armonk, N.Y.

VEA 700 allows access by the visual builder 708 to beans contained in JAR file 702, which beans may be the beans created by the bean creator as discussed above. VEA 700 makes the method and constructor beans available to be read into the "palette" of the visual builder 708. A user can then copy beans from the palette into the visual builder "workspace" to customize and combine the beans as needed in order to create a new OOP application 710 in a conventional manner. Non-bean text-based OOP code can also be read in using the VEA's Interactive Development Environment (IDE) 712, which, in turn, uses the aforementioned bean compiler to produce beans that are usable by the visual builder 708.

Figure 8:
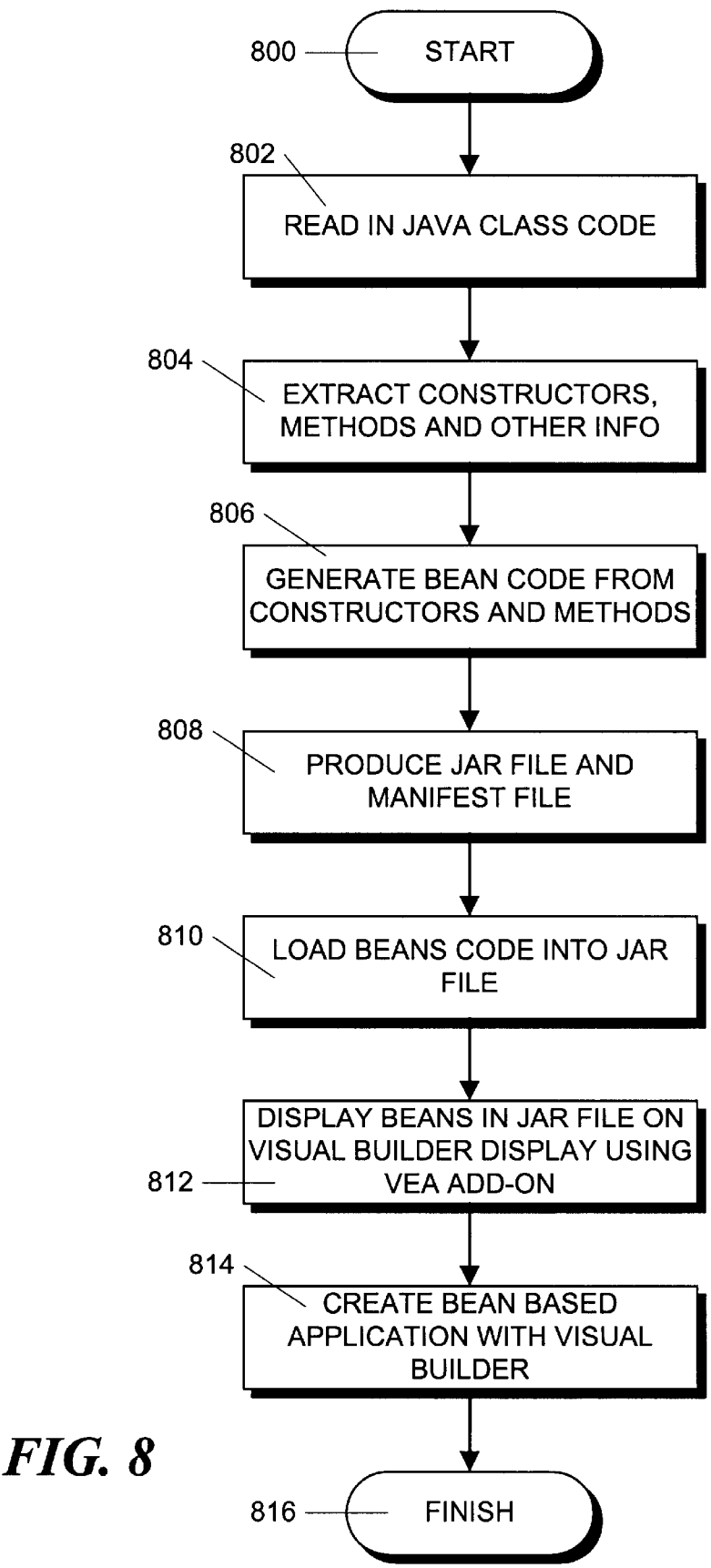
FIG. 8 is a flowchart depicting the steps in an illustrative routine for generating a bean-based application using the inventive apparatus and method.

Referring to FIG. 8, the entire process of creating bean-based applications from original text-based OOP code is illustrated. The process starts in step 800 and proceeds to step 802 where object-oriented design code is read in to the bean creator 200.

In step 804, the class code is parsed and the constructors, methods and other information discussed above is extracted. The extracted information is used to generate bean code which is then compiled, in step 806, to produce method and constructor beans. In step 808, the bean creator 200 produces the JAR and manifest files which contain the newly-produced beans. The beans are loaded into the JAR file in step 810.

In step 812, the new beans are placed on the palette of a visual builder using the visual environment add-on. In step 814, the bean visual environment add-on is used, in conjunction with a visual builder 1320, to create a bean-based application. At step 816, the process is complete.

Figure 9:
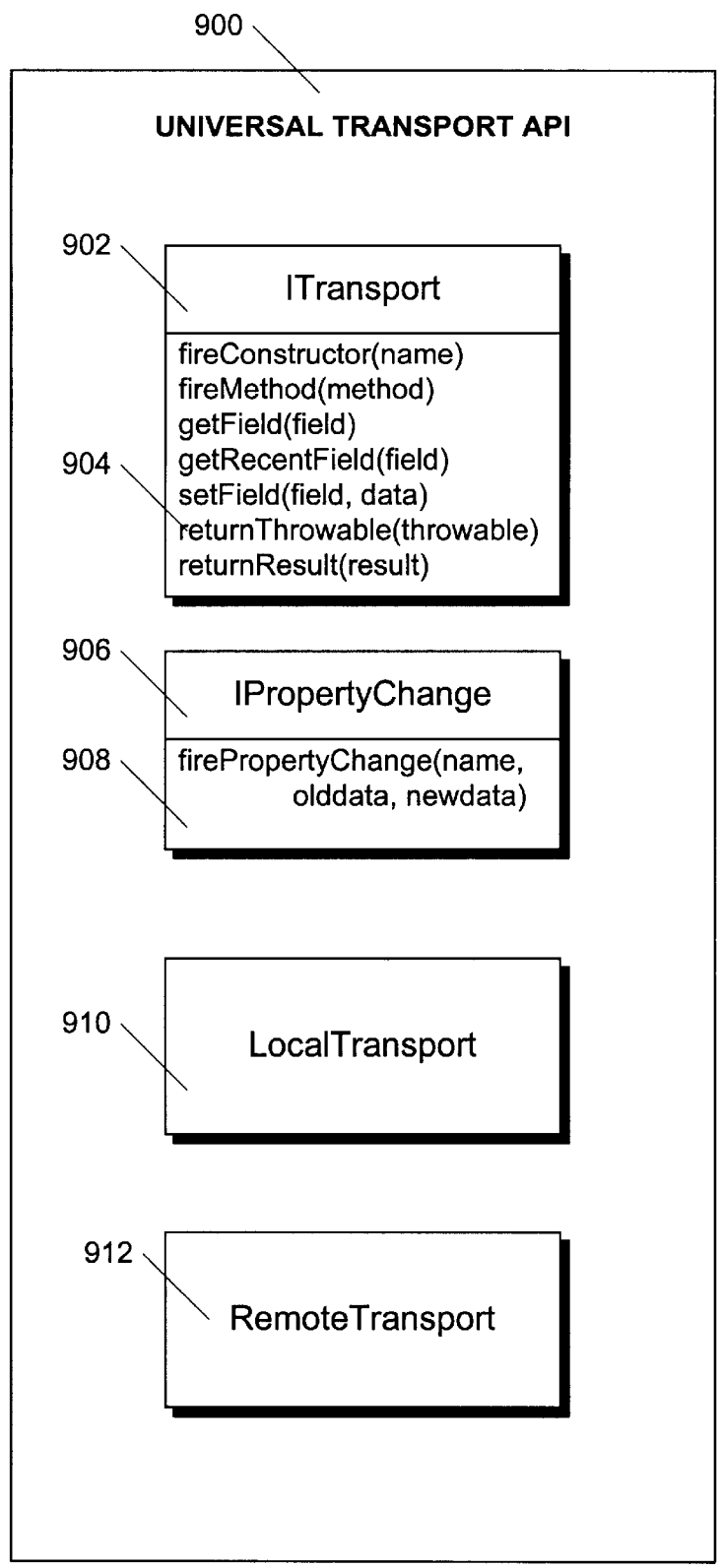
FIG. 9 is a schematic block diagram of interface and implementation classes composing a universal transport API of the illustrative embodiment.

Once a bean-based application is created, it interacts with the code implementing the underlying Java class by means of a universal transport API. This process is illustrated in FIG. 2 where bean-based application 216 uses universal transport API 206 to operate with class implementations 202. FIG. 9 illustrates the contents of the universal transport API 206, which include several Java interfaces 902 and 906 and implementation classes 910 and 912. The universal transport API 900 provides a framework for manipulating Java objects in a "bean-oriented" manner according to the ITransport interface 902. Interface 902 contains methods 904 which allow either local or remote objects to be constructed using both null and complex constructors (fireConstructor), methods to be called (fireMethod), and field values to be set and retrieved (setField and getField, respectively.) A null constructor is one which has no parameters whereas a complex constructor is passed parameters or arguments to construct objects.

The interface 902 has two implementations: LocalTransport 910 and RemoteTransport 912. The LocalTransport implementation 910 translates application-specific messages into method calls on local Java objects (not shown.) The RemoteTransport implementation 912 is utilized in conjunction with a distributed object architecture to translate application-specific messages into method calls on remote Java objects (not shown.) If distributed object framework is used, remote objects, such as RMI objects, CORBA objects or Java objects which are not RMI or CORBA compliant can be accessed by selecting an appropriate adapter (not shown) for the object model.

The universal transport API 900 also includes an IPropertyChange interface 906 which contains, among other things, a method 908 that transmits data change notifications to registered listeners in accordance with a conventional notification arrangement.

In order to use the universal transport API 900, a transport object is first instantiated from the LocalTransport or the RemoteTransport class according to the location of the target class implementations. Then, a constructor bean method or method bean method which invokes a target method in the target class encapsulates the target method parameters in an object instantiated from the MethodEvent class 416 (FIG. 4) in order to permit late binding. The MethodEvent object can be serialized and transmitted over a network by the fireMethod method in the transport object to the class implementations. Exceptions, and other throwables, are encapsulated in an object created from ExceptionEvent class 418 which also allows for serialization. The ExceptionEvent class 418 allows exceptions which would normally be lost to be transmitted back to the client application. For example, a remote RMI-compliant object which stores employee information for a business will throw an exception when a look up error such as "Employee not found in records" occurs. In accordance with normal RMI operation, this exception will be hidden from the client by a java.RMI.RemoteException object and appear to the client as a network failure, rather than the lack of the searched instance. However, with the inventive bean creator using the API transport 206, encapsulation and serialization of the exception allows the original exception, "Employee not found in records," to propagate from the server back to the client.

Constructor parameters are encapsulated in a SmartConstructor class 414, which also permits late binding and serialization. Methods which set and get field values in the target object are also serialized, but they are not encapsulated within separate classes because this encapsulation is handled by the SmartConstructor class 414. Therefore, the RemoteTransport implementation 912 allows direct access to remote native methods in a Java class without requiring a server-side wrapper class to be used. Generation of such a server-side wrapper class would require manual coding go and could perturb the original code design, both of which are undesirable.

Figure 10:
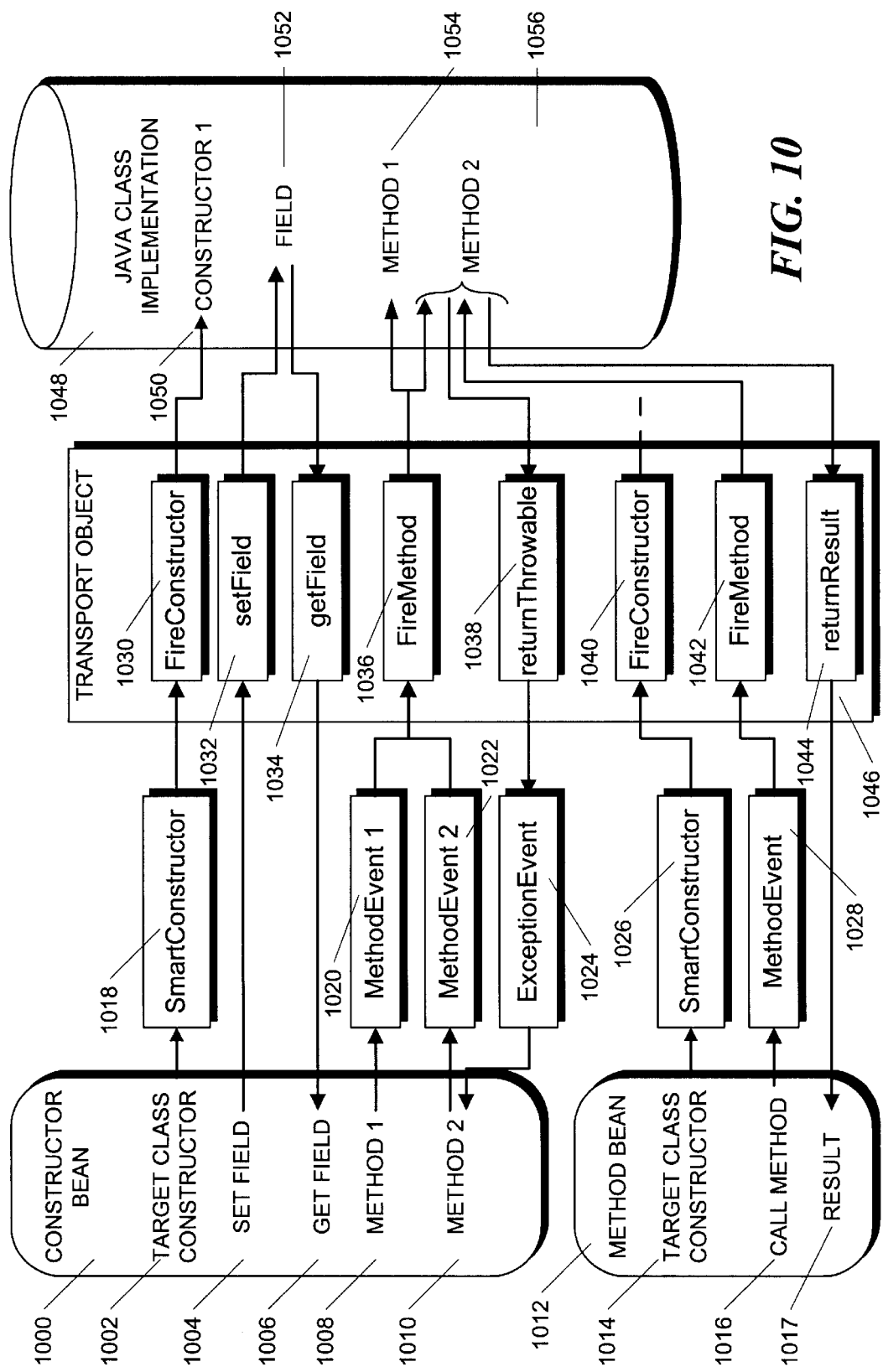
FIG. 10 is a schematic block diagram illustrating the control of class implementations by a constructor and method bean using the universal transport API.

FIG. 10 illustrates, in a schematic fashion, the operation of the constructor and method beans in conjunction with a transport object to manipulate the code for the target object. A single constructor bean and a single method bean are shown, but additional beans can be generated which operate in the same manner as those shown. Constructor bean 1000 includes a targetClassConstructor( ) method 1002 which is designed to invoke either a null, or a complex, constructor in the target class. The setField( ) and getField( )methods 1004, 1006, respectively, are used to manipulate values in fields and properties of the target object. In addition, constructor bean 1000 includes two methods designated as Method 1 1008 and Method 2 1010. These methods interact With methods in the transport object 1046 to invoke methods in the Java class implementation 1048. For example, when the targetClassConstructor( ) method 1002 is invoked in constructor bean 1000, it instantiates a SmartConstructor object 1018 passing in any parameters which are required for invocation of the constructor in the target class. The SmartConstructor object 1018 is, in turn, passed to the fireConstructor( ) method 1030 in the transport object 1046. The fireConstructor( ) method 1030, in turn, invokes the constructor 1050 with the appropriate parameters in the target class implementation 1048 to construct the target object.

Fields in the target object, such as field 1052 can be manipulated by means of the setField( ) method 1004 in constructor bean 1000. The setField method, in turn, invokes the setField method 1032 in the transport object 1046 in order to insert a value into field 1052 of the target object. Similarly, the value in field 1052 can be retrieved by means of the getField( ) method 1034 in transport object 1046 and returned to the getField( ) method 1006 in constructor bean 1000.

If Method 1 (1008) is invoked in constructor bean 1000, it instantiates a MethodEvent object 1020 which encapsulates parameters and data associated with the method. The MethodEvent object 1020 is then passed to the fireMethod( ) method 1036 in transport object 1046. The fireMethod( ) method invokes Method 1 (1054) in the target object passing in the encapsulated parameters as necessary. An invocation of Method 2 (1010) instantiates a second MethodEvent object 1022 which is then passed to the fireMethod( ) method 1036 to invoke Method 2 (1056) in the manner previously described.

If either of the methods 1054 or 1056 generates an exception or other throwable, the throwable is returned via the return Throwable( ) method 1038 in transport object 1046 which, in turn, creates an ExceptionEvent object 1024 encapsulating the exception parameters including any exception text. The ExceptionEvent object is then returned to the constructor bean 1000.

The method bean 1012 operates in a similar manner. It also contains a targetClassConstructor( ) method 1014 which, in turn, instantiates a SmartConstructor object 1026 that can be applied to the fireConstructor( ) method 1040 in transport object 1046. Method 1040 may be the same as method 1030, but is shown separately for clarity. This operation constructs the target object if it is not already constructed.

Similarly, an invocation of the callMethod( ) method 1016 in method bean 1012 causes a MethodEvent object 1028 to be instantiated, which MethodEvent object encapsulates the parameters of the method. The MethodEvent object 1028 is, in turn, passed to a fireMethod( ) method 1042 (which may be the same as method 1036) in the transport object 1046 which, in turn, invokes the proper method in the target object.

The result generated by an invoked method is returned by the returnResult( ) method 1044 in transport object 1046 which transports the result to the Result property 1017 in method bean 1012.

The following is an example of the operation of the bean compiler. In this example the target class is a Java class called AccountInfo. The class contains the account owner's first and last names and retrieves information about an account owner, including the owner's date of birth (DOB), account balance and type, etc. The COM.test.AccountInfo class has a class definition as follows:

```
package COM.test;
public class AccountInfo
{
public String firstName, lastName;
public AccountInfo(String SSN)
   throws Exception
{ . . . }
public String getDOB
{ . . . }
public String getAccountType( )
{ . . . }
public Float getBalance( )
{ . . . }
public void setBalance (Float bal)
{ . . . }
public String createReport (boolean history)
{ . . . }
}
```

Using the inventive bean compiler, two classes would be generated based upon this class definition. The first generated class is a constructor bean for the class constructor:

public AccountInfo (String SSN).

The skeleton of the constructor bean class would be as illustrated in the Java code snippet which follows:

```
package COM.test;
public class AccountInfoSBC1
   extends ConstructorSmartBean
   implements java.io.Serializable
{
   //Constructor Type array
   private Class fTypes [ ]={String.class};
   //Constructor Parameters
   private Object fParams [ ]=new Object [1];
   . . .
}
```

Note that this constructor bean class inherits from the constructor bean base class, ConstructorSmartBean, and is serializable. The "SBC1" postfix indicates that this is constructor number 1 for a constructor bean., The class also contains two private fields. The first field fTypes is used to locate the correct constructor for the target object. The second field, fParams, is used to hold and pass the constructor parameters, which appear in this constructor bean as properties.

Next, the constructor for the AccountInforSBC1 constructor bean class is created as illustrated in the Java code snippet below:

```
public AccountInfoSBC1( ) throws Exception
{
  super( )
  try
  {
    setConstructor (new SmartConstructor
       ("COM.test.AccountInfo", fTypes));
  }
  catch (Exception e)
  {
  }
}
```

This constructor instantiates a SmartConstructor object for the eventual target class COM.test.AccountInfo.

Next, code to handle the retrieval of the constructor parameters, as well as property change notifications for the target object's original fields is generated as shown in the following Java code snippet:

```
public Object [ ] getConstructorParameters( )
{return fParams;}
public void refreshProperties( )
{
  fPropertyChange.firePropertyChange("lastName", null,
    getLastName( ));
  fPropertyChange.firePropertyChange("firstName", null,
    getFirstName( ));
  fPropertyChange.firePropertyChange("DOB", null,
    getDOB( ));
  fPropertyChange.firePropertyChange("accountType",
    null, getAccount Type( ));
  fPropertyChange.firePropertyChange("balance", null,
    getBalance( ));
}
```

Note the reference fPropertyChange to a data notification object which transmits the data change to all interested "listener" parties.

Next, code to handle the getting and setting of properties originally specified as public fields on the target object is created. The following code snippet illustrates the code which manipulates the target object lastName field. The code for other fields is analogous. This code uses a reference fTransport to a transport object which conveys the object invocations to the target object:

```
public String getLastName( )
{
  try
  {
    return (String) fTransport.getField("lastName");
  }
  catch (Throwable t)
    {return null;}
}
public void setLastName(String data)
{
  try
    Object old=fTransport.getRecentField ("lastName");
    fTransport.setField("lastName", data);
    fPropertyChange.firePropertyChange("lastName, old,
       data);
  }
```

```
  catch (Throwable t)
    {return;}
```

Note that a property change notification is sent when the value of the lastName field changes indicating that this is a bound field. Since certain methods of the target class are treated as constructor bean properties because of the set/get design patterns they express, they are handled as illustrated in the following code snippet. Only the getBalance( ) and setBalance methods are illustrated, other methods are treated in a similar manner,

```
public Float getBalance( )
{
  try
  {
    Class types[ ]={ };
    Object params[ ]={ };
    MethodEvent method=new MethodEvent (this,
       "getBalance", types, params, true);
    return (Float) fTransport.fireMethod(method);
  }
  catch (Throwable t)
    {return null;}
}
public void SetBalance (Float data)
{
  try
  {
    Object old=fTransport.getRecentField("balance");
    Class types [ ]={Float.class};
    Object params [ ]={bal};
    MethodEvent method=new MethodEvent (this,
       "setBalance", types, params, true);
    fTransport.fireMethod(method);
    fPropertyChange.firePropertyChange("balance", old,
       bal);
    return;
  }
  catch (Throwable t)
    {return;}
```

The inventive bean compiler also generates a bean for each method in the target class. The bean has the same name as the method with a postfix "SBM." The "SBM" postfix indicates this is a method bean. A partial class definition for the createReport method in the sample target class is illustrated by the following Java code snippet: public class CreateReportSBM

```
  extends MethodSmartBean
{
  private String fResult=null;
  private Class fTypes[ ]={Boolean.class};
  private Object fParams[ ]=new Object [1];
}
```

As with the aforementioned constructor bean, this class also contains two private fields. The first field fTypes is used to locate the correct constructor for the target object. The second field, fParams, is used to hold and pass the constructor parameters, which appear in this bean as properties. This method bean class also has a third private field, namely the fResult field used to hold the result from the method call. The constructor for this method Bean is generated as follows:

```
public CreateReportSBM( )
  super ("createReport");
  fParams[0]=Boolean.FALSE; }
```

This constructor passes the name of the target object method to its parent's constructor. It also initializes the parameters array. Note that since the parameter for the method is a primitive type, the compiler must be intelligent enough to convert to the corresponding Object type, as well as to supply a default value.

The illustrative method bean also contains the next code section which is similar for any method bean:

```
public void putMethodResult (Object result)
{
    fResult=(String) result;
    fPropertyChange.firePropertyChange("result", null, fResult);
}
public String getResult( )
{
    return fResult;
}
```

The first method, putMethodResult, allows the parent class to set the result value returned from a method call, and also allows the method bean to generate a data change notification when the result value is changed. The second method merely allows the result to be treated as a readable property. Note that for each method bean, the result type may be different.

The following two additional methods in the method bean code allow the parent class to retrieve the method types and method parameters:

```
public Class [ ] getTypes( )
{
    return fTypes;
}
public Object [ ] getParameters( )
{
    return fParams;
}
```

The following additional methods handle the parameters of the target method itself, while treating these parameters as bound properties of the method bean.

```
public boolean getHistory( )
{
    return
    ((Boolean)fParams[0]).booleanValue( );
}
public void setHistory(boolean data)
{
    Object old=fParams [0];
    fParams [0]=new Boolean (data):
    fPropertyChange.firePropertyChange("History", old,
        fParams[0]);
}
```

Note again the primitive to corresponding-data-type translation. This is needed for fields of types int, short, long, boolean, byte, char, float, and double.

A software implementation of the above-described embodiment may comprise a series of computer instructions either fixed on a tangible medium, such as a computer readable media, e.g. a diskette, a CD-ROM, a ROM memory, or a fixed disk, or transmissible to a computer system, via a modem or other interface device over a medium. The medium can be either a tangible medium, including, but not limited to, optical or analog communications lines, or may be implemented with wireless techniques, including but not limited to microwave, infrared or other transmission techniques. It may also be the Internet. The series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, pre-loaded with a computer system, e.g., on system ROM or fixed disk, or distributed from a server or electronic bulletin board over a network, e.g., the Internet or World Wide Web.

Although an exemplary embodiment of the invention has been disclosed, it will be apparent to those skilled in the art that various changes and modifications can be made which will achieve some of the advantages of the invention without departing from the spirit and scope of the invention. For example, it will be obvious to those reasonably skilled in the art that, although the description was directed to a particular language, other object-oriented languages would also be suitable for the invention. Similarly, although a particular hardware system and operating system is described, other hardware and operating system software could be used in the same manner as that described. Other aspects, such as the specific instructions utilized to achieve a particular function, as well as other modifications to the inventive concept are intended to be covered by the appended claims.

What is claimed is:

1. Apparatus for allowing text-based object-oriented class code to be used with a visual builder that operates with software having a predetermined format, the apparatus implemented on a computer system having a memory and comprising:

a parser responsive to text-based object-oriented class code that is not in the predetermined format for extracting selected information from the class code;

a compiler for creating proxy components from the selected information, the proxy components representing the parsed text-based object-oriented class code in the visual builder and containing software code in the predetermined format; and an add-on program which allows the proxy components to be used with the visual builder.

2. The apparatus of claim 1 wherein the selected information includes constructors, methods and parameters.

3. The apparatus of claim 2 wherein the compiler creates a proxy component from each constructor and method.

4. The apparatus of claim 3 wherein the methods include parameters and wherein the compiler includes a converter which converts the method parameters into proxy component properties.

5. The apparatus of claim 4 wherein the component properties are bound.

6. The apparatus of claim 1 further comprising a transport mechanism which is responsive to the proxy components for controlling the object-oriented class code.

7. The apparatus of claim 6 wherein each proxy component includes a method with parameters and wherein the proxy component is responsive to an invocation of the method for instantiating an event object encapsulating the method parameters.

8. The apparatus of claim 7 wherein the transport mechanism is responsive to an event object for controlling the object-oriented class code.

9. The apparatus of claim 7 wherein exceptions which occur during operation of the method are encapsulated in an exception event object.

10. The apparatus of claim 1, wherein a constructor proxy component includes a constructor and wherein the constructor proxy component is responsive to an invocation of the constructor for instantiating a target object from the object oriented class code.

11. A method for allowing text-based object-oriented class code to be used with a visual builder that operates with software having a predetermined format, the method implemented on a computer system having a memory, and comprising the steps of:
(a) extracting selected information from text-based object-oriented class code that is not in the predetermined format;
(b) creating proxy components in the memory from the selected information, the proxy components representing the parsed text-based object-oriented class code in the visual builder and containing software code in the predetermined format; and
(c) connecting an add-on program to the visual builder which add-on program allows the proxy components to be used with the visual builder.

12. The method of claim 11 wherein the selected information includes constructors, methods and parameters.

13. The method of claim 12 wherein step (b) comprises the step of:
(b1) creating a proxy component from each constructor and method.

14. The method of claim 13 wherein the methods include parameters and wherein step (b) comprises the step of:
(b2) converting the method parameters into proxy component properties.

15. The method of claim 14 wherein step (b) comprises the step of:
(b3) converting the method parameters into bound proxy component properties.

16. The method of claim 11 further comprising the step of:
(d) using a transport mechanism which is responsive to the proxy components for controlling the object-oriented class code.

17. The method of claim 16 wherein each proxy component includes a method with parameters and wherein step (d) comprises the step of:
(d1) instantiating an event object encapsulating the method in response to an invocation of the method.

18. The method of claim 17 wherein step (d) comprises the step of:
(d2) using the transport mechanism in response to an event object for controlling the object-oriented class code.

19. The method of claim 17 further comprising the step of:
(e) encapsulating exceptions which occur during operation of the method in an exception event object.

20. The method of claim 11, wherein a constructor proxy component includes a constructor and wherein step (d) further comprises the step of:
(d3) instantiating a target object from the object oriented class code in response to an invocation of the constructor.

21. A computer program product for allowing text-based object-oriented class code to be used with a visual builder that operates with software having a predetermined format, the computer program product comprising a computer usable medium having computer readable program code thereon including:
program code for extracting selected information from text-based objects oriented class code that is not in the predetermined format;
program code for creating proxy components from the selected information, the proxy components representing the parsed text-based object-oriented class code in the visual builder and containing software code in the predetermined format; and
an add-on program for connection to the visual builder which add-on program allows the proxy components to be used with the visual builder.

22. The computer program product of claim 21 wherein the selected information includes constructors, methods and parameters.

23. The computer program product of claim 22 wherein the program code for creating proxy components comprises program code for creating a proxy component from each constructor and method.

24. The computer program product of claim 23 wherein the methods include parameters and wherein the program code for creating proxy components comprises program code for converting the method parameters into proxy component properties.

25. The computer program product of claim 24 wherein the program code for creating proxy components comprises program code for converting the method parameters into bound proxy component properties.

26. The computer program product of claim 21 further comprising:
program code for creating a transport mechanism which is responsive to the proxy components for controlling the object-oriented class code.

27. The computer program product of claim 26 wherein each proxy component includes a method with parameters and wherein the proxy component includes program code for instantiating an event object encapsulating the method in response to an invocation of the method.

28. The computer program product of claim 27 wherein the program code for creating a transport mechanism comprises program code for using the transport mechanism in response to an event object for controlling the object-oriented class code.

29. The computer program product of claim 27 further comprising program code for encapsulating exceptions which occur during operation of the method in an exception event object.

30. The computer program product of claim 21, wherein a constructor proxy component includes a constructor and the constructor proxy component comprises program code for instantiating a target object from the object oriented class code in response to an invocation of the constructor.

* * * * *